United States Patent
Van der Heijden et al.

(10) Patent No.: US 6,813,115 B2
(45) Date of Patent: Nov. 2, 2004

(54) PERPENDICULAR MAGNETIC RECORDING HEAD WITH IMPROVED WRITE FIELD GRADIENT

(75) Inventors: Petrus A. Van der Heijden, Cranberry Township, PA (US); Sharat Batra, Wexford, PA (US); Gregory Parker, Warrendale, PA (US); Jonathan D. Hannay, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 77 days.

(21) Appl. No.: 10/235,356

(22) Filed: Sep. 5, 2002

(65) Prior Publication Data

US 2003/0197976 A1 Oct. 23, 2003

Related U.S. Application Data

(60) Provisional application No. 60/373,562, filed on Apr. 18, 2002.

(51) Int. Cl.[7] .......................... G11B 5/127; G11B 5/147
(52) U.S. Cl. ...................................................... 360/125
(58) Field of Search ............................... 360/121, 122, 360/123, 124, 125, 126, 127, 120; 29/603.3, 603.13, 603.14

(56) References Cited

U.S. PATENT DOCUMENTS

| | | | |
|---|---|---|---|
| 3,639,699 A | * | 2/1972 | Tiemann ...................... 360/126 |
| 4,138,702 A | | 2/1979 | Magnenet |
| 4,423,450 A | | 12/1983 | Hamilton |
| 4,441,131 A | * | 4/1984 | Osanai ........................ 360/125 |
| 4,541,026 A | * | 9/1985 | Bonin et al. ................. 360/126 |
| 4,672,494 A | * | 6/1987 | Furuya et al. ............... 360/125 |
| 4,764,833 A | * | 8/1988 | Imamura et al. ............. 360/126 |
| 4,873,599 A | | 10/1989 | Sueoka |
| 4,901,179 A | * | 2/1990 | Satomi et al. ............... 360/126 |
| 4,974,110 A | | 11/1990 | Kanamine et al. |
| 5,014,148 A | | 5/1991 | Numazawa et al. |
| 5,157,570 A | * | 10/1992 | Shukovsky et al. .......... 360/126 |
| 5,617,071 A | * | 4/1997 | Daughton .................. 338/32 R |
| 5,673,163 A | | 9/1997 | Cohen |
| 5,920,449 A | | 7/1999 | Tagawa |
| 5,991,126 A | | 11/1999 | Hayashi et al. |
| 6,091,582 A | | 7/2000 | Komuro et al. |
| 6,151,193 A | * | 11/2000 | Terunuma et al. ........... 360/126 |
| 6,243,288 B1 | * | 6/2001 | Ishikawa et al. ............ 365/158 |
| 6,259,583 B1 | * | 7/2001 | Fontana et al. .............. 360/126 |
| 6,278,590 B1 | * | 8/2001 | Gill et al. .................... 360/317 |
| 6,296,955 B1 | * | 10/2001 | Hossain et al. .............. 360/125 |
| 6,721,131 B2 | * | 4/2004 | Litvinov et al. ............. 360/125 |
| 2002/0131203 A1 | * | 9/2002 | Litvinov et al. ............. 360/125 |
| 2003/0076629 A1 | * | 4/2003 | Minor ......................... 360/126 |

FOREIGN PATENT DOCUMENTS

| | | | | | |
|---|---|---|---|---|---|
| JP | 63144403 A | * | 6/1988 | ........... | G11B/5/265 |
| JP | 02 02 99 04 | * | 1/1990 | ........... | G11B/5/127 |
| JP | 02216604 A | * | 8/1990 | ............ | G11B/5/23 |

* cited by examiner

*Primary Examiner*—George J. Letscher
*Assistant Examiner*—Christopher R Magee
(74) *Attorney, Agent, or Firm*—Buchanan Ingersoll PC

(57) ABSTRACT

A single pole magnetic recording head is provided according to the present invention for perpendicular magnetic recording on a recording medium. The magnetic recording head includes a main magnetic pole and a coil magnetically coupled to the main pole for magnetizing the main pole in a first magnetization direction. The magnetic recording head further includes a layer of ferromagnetic material anti-ferromagnetically coupled to the main pole such that magnetization of the ferromagnetic layer is in a second magnetization direction substantially anti-parallel to the first magnetization direction of the main pole.

20 Claims, 4 Drawing Sheets

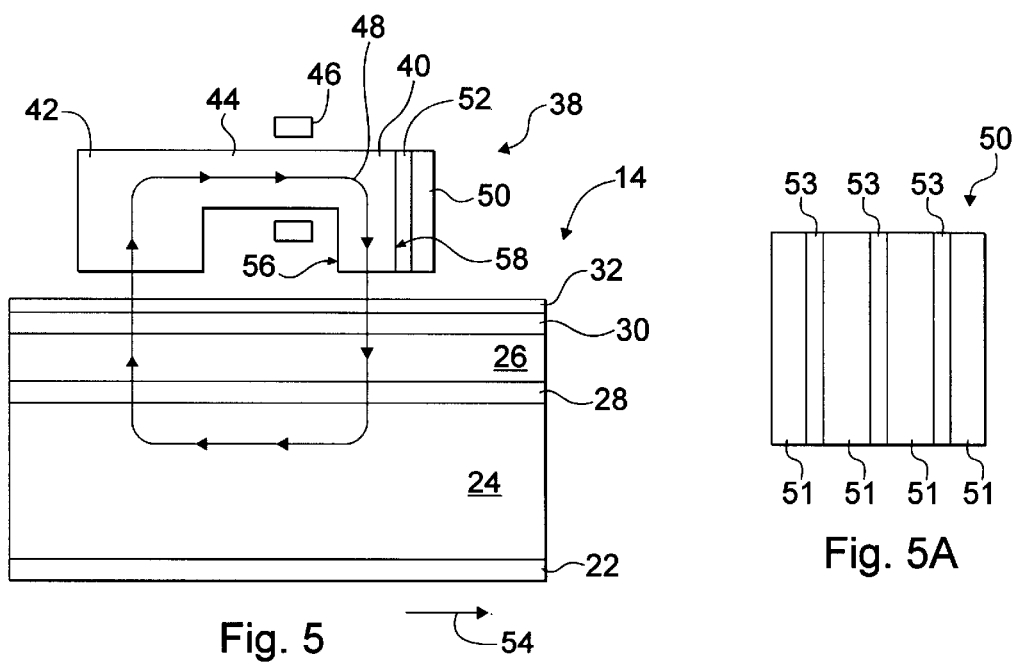
Fig. 5
Fig. 5A
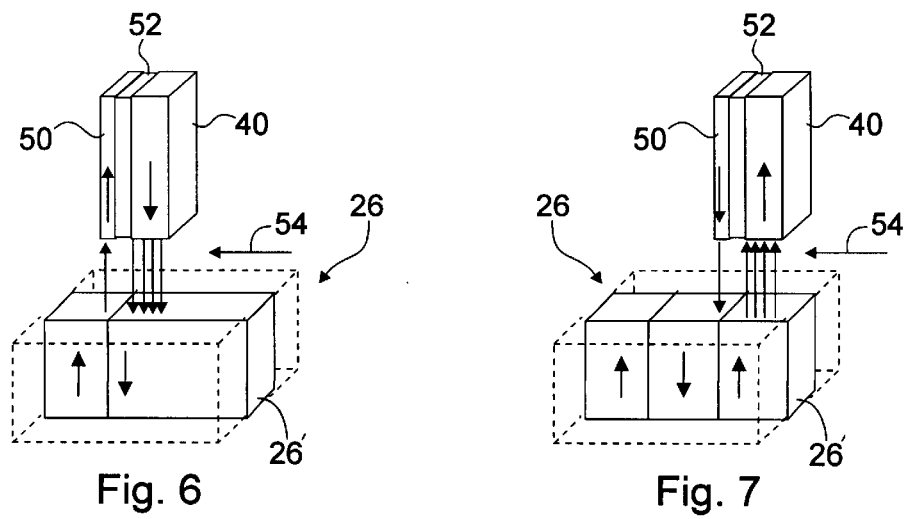
Fig. 6
Fig. 7

PERPENDICULAR MAGNETIC RECORDING HEAD WITH IMPROVED WRITE FIELD GRADIENT

CROSS-REFERENCE TO RELATED APPLICATIONS

This application claims the benefit of co-pending provisional patent application Ser. No. 60/373,562 entitled "Improved Write Field Gradient for a Magnetic Transducer Used in a Perpendicular Recording System", filed on Apr. 18, 2002, the entire disclosure of which is incorporated by reference herein.

FIELD OF THE INVENTION

The present invention is directed toward magnetic recording heads and, more particularly, toward perpendicular magnetic recording heads having an improved write field gradient.

BACKGROUND OF THE INVENTION

The ability to increase the storage capacity in magnetic recording is an ongoing concern. As the amount of information to be stored continues to increase, demands for higher density recording also continue to increase. In conventional longitudinal magnetic recording systems, as areal densities approach 100 Gbit/in$^2$ it has become increasingly difficult to meet the requirements of thermal stability (the degradation of written information due to thermal fluctuations), SNR (Signal-To-Noise Ratio) and writeability. Perpendicular recording is considered as one of the possibilities to achieve ultrahigh areal densities beyond conventional longitudinal recording.

Ultrahigh areal densities can be obtained in a perpendicular recording system by increasing the linear and/or track densities. For high linear densities, the transition parameter of a bit transition, as well as the transition jitter, need to be minimized. The actual values of the transition parameter and the transition jitter will depend upon both the properties of the recording medium and the on-track field gradient of the write head. In an ideal case, the write field gradient should be a step, i.e., an infinite slope of the field gradient, at the dynamic coercivity of the recording medium being used. In a similar manner, the track density that can be obtained will depend, in part, on the off-track field gradient of the write head.

One perpendicular recording system configuration, shown in FIG. 1, uses a single pole write head with a wide return pole and a recording medium which includes a magnetically soft underlayer and a magnetically hard recording layer, conventionally known as a double layered recording medium. As shown in FIG. 1, the magnetic recording head 10 has a single (main) pole 12 for generating a field at the recording media 14, and is conventionally known as a single pole magnetic recording head. The magnetic recording head 10 includes the main pole 12, a return pole 16 and a magnetic via 18 connecting the main 12 and return 16 poles. An electrically conductive magnetizing coil 20 surrounds the magnetic via 18.

The recording media 14 typically includes a substrate 22, a soft magnetic underlayer 24 formed on the substrate 22 and a perpendicularly magnetized recording layer 26 on top of the soft underlayer 24. Additionally, the recording media 14 includes a spacing layer 28 between the soft underlayer 24 and the recording layer 26, and thin layers of carbon overcoat 30 and lubricant 32 on top of the recording layer 26. The carbon layer 30 is applied to the magnetic recording layer 26 and protects the magnetic recording layer 26 against damage from direct contact with the read/write head, and also serves as a corrosion barrier to prevent oxidation of the magnetic recording layer 26. The lubricant layer 32 is applied to the carbon layer 30 and has viscous properties to produce sheer stresses between the read/write head and disc during contact.

When writing, the magnetic recording head 10 is separated from the recording media 14 by a distance conventionally known as the "fly height". The recording media 14 is moved past the magnetic recording head 10 such that the recording head 10 follows the tracks of the recording media 14. The track of the recording medium 26 on which information is being recorded in FIG. 3 is denoted by 26'. The coil 20 is traversed by a current and produces a magnetic flux 34 which is channeled by the main pole 12 to produce an intense writing flux at the tip 36 of the main pole 12 which records the information in the magnetic recording layer 26'. The flux 34 passes from the tip 36 of the main pole 12, through the magnetic recording layer 26', into the soft underlayer 24, and across to the return pole 16, which provides a return path for the flux 34. Thus, a closed magnetic circuit is formed in which the magnetic flux in the recording layer 26' directly under the poles 12, 16 of the magnetic recording head 10 is oriented perpendicular to the plane of the recording layer 26. The cross-sectional area of the return pole 16 is larger than that of the main pole 12 to ensure that the flux density at the return pole 16 is sufficiently reduced as not to magnetize the recording layer 26'.

By way of example, a perpendicular recording system proposed for an areal density of 100 Gbit/in$^2$ uses a single pole write (main) head 12 having a width of 130 nm and a thickness of 300 nm. A hard recording layer 26 thickness of 16 nm typically yields a total soft underlayer 24 to main pole 12 spacing of about 35 nm (which includes the spacing layer 28, the overcoat 30, the lubricant 32 and air).

As a consequence of the relatively large 35 nm spacing between the main pole 12 and the soft underlayer 24 as compared to the main pole 12 width of 130 nm and pole height of 300 nm, the maximum field in the write gap is reduced significantly from 4 $\pi M_s$, the saturation magnetic flux density of the main pole 12. FIG. 2 illustrates a maximal on-track field (Hy) of about 1.2 Tesla for the conventional recording head 10 using a saturation magnetic flux density value of 2.0 Tesla. This results in a reduced write on- and off-track field gradient for recording head 10. An additional consequence of the significant write gap relative to the dimensions of the main pole 12 is that the flux from the sides of the main pole 12 which are recessed from air bearing surface of the main pole 12 will contribute to the field at the write gap. This additional flux will degrade the write field gradient for both the on- and off-track directions. The flux arising from the magnetization at the air bearing surface of the main pole 12, as well as from the sides of the main pole 12, is schematically illustrated in FIG. 3. The graph of FIG. 4 illustrates the magnitude of the flux from the sides of the main pole 12 as the sides become further recessed from the air bearing surface of the main pole 12. The general scaling trend of perpendicular recording towards Tbit/in$^2$ is such that the write field gradient will further deteriorate as the reduction in spacing between the main pole 12 and the soft underlayer 24 is small relative to reductions in the main pole 12 width and height.

An integral aspect of perpendicular recording is that the write field at the tip of the main pole is mainly perpendicular to the plane of the recording layer. It is known that the writeability, as well as the writing speed, of a perpendicularly magnetized grain depends upon the angle of the applied field to its uniaxial anisotropy axis, with perfect anti-parallel alignment being the worst. A small, longitudinal field component in the write field gradient will increase the writeability and write speed for a perpendicularly oriented grain without degrading the transition parameter, as long as the write field is primarily perpendicular to the recording layer.

The present invention is directed toward overcoming one or more of the above-mentioned problems.

SUMMARY OF THE INVENTION

A single pole magnetic recording head is provided according to the present invention for perpendicular magnetic recording on a recording medium. The magnetic recording head includes a main magnetic pole, i.e., a single pole magnetic recording head, and a coil magnetically coupled to the main pole for magnetizing the main pole in a first magnetization direction. The magnetic recording head further includes a layer of ferromagnetic material anti-ferromagnetically coupled to the main pole such that magnetization of the ferromagnetic layer is in a second magnetization direction substantially anti-parallel to the first magnetization direction of the main pole.

In one form, the anti-ferromagnetic coupling is accomplished via an interlayer disposed between the main pole and the ferromagnetic layer. The interlayer and the ferromagnetic layer may be substantially the same shape as the main pole, or may be provided only at a pole tip region of the main pole. The interlayer provided between the ferromagnetic layer and the main pole may include a thin layer of ruthenium.

In another form, the interlayer and the ferromagnetic layer are provided only at a trailing edge of the main pole.

In a further form, the main pole and the ferromagnetic layer are each made of at least one material selected from the group of soft magnetic materials including at least one of Co, Fe and Ni. Additionally, the ferromagnetic layer may have a saturation magnetic flux density equal to or less than the saturation magnetic flux density of the main pole.

In yet a further form, the thickness of the main pole is greater than the thicknesses of the ferromagnetic layer and the interlayer.

It is an aspect of the present invention to improve the write field gradient for a perpendicular magnetic recording head in both the on-track and off-track directions.

Other aspects and advantages of the present invention can be obtained from a study of the specification, the drawings, and the appended claims.

BRIEF DESCRIPTION OF THE DRAWINGS

FIG. 5 is a partial side view of a perpendicular magnetic recording head according to the present invention;

FIG. 5A is a partial side view of an alternate embodiment of the ferromagnetic layer in FIG. 5;

FIGS. 6–7 are partial isometric views of the perpendicular magnetic recording head shown in FIG. 3, illustrating the main pole, interlayer, ferromagnetic layer and recording layer;

DETAILED DESCRIPTION OF THE INVENTION

Figure 1:
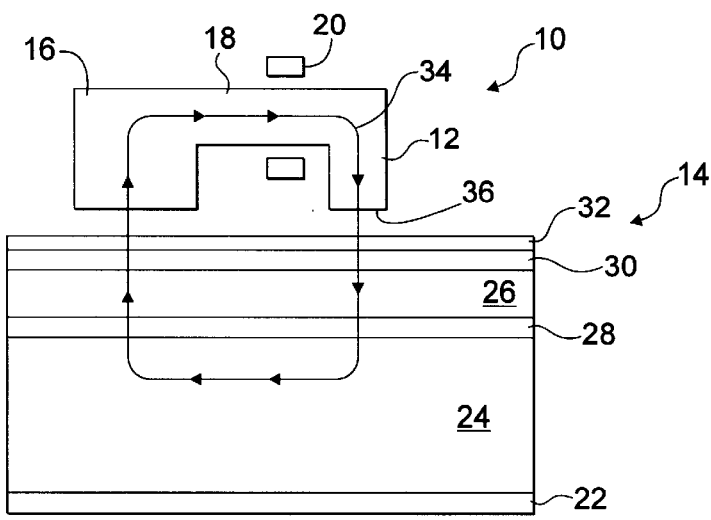
FIG. 1 is a partial side view of a prior art perpendicular magnetic recording head.

FIG. 5 illustrates a perpendicular magnetic recording head, shown generally at 38, according to the present invention. The magnetic recording head 38 includes a main magnetic pole 40, a magnetic return pole 42 and a magnetic via 44 connecting the main 40 and return 42 poles. An electrically conductive magnetizing coil 46 is provided about the magnetic via 44 and is magnetically coupled to the main pole 40 to generate a write flux 48 through the main pole 40. Typically, the recording head 38 is positioned above the recording media 14 for reading and writing, with the separation distance commonly known as the "fly height". A typical fly height separation distance ranges from 0 nm (contact recording) to about 60 nm.

The magnetic recording head 38 includes a thin ferromagnetic layer 50 anti-ferromagnetically coupled to the main pole 40. The anti-ferromagnetic coupling is accomplished via an interlayer 52 provided between the main pole 40 and the ferromagnetic layer 50 which provides a strong anti-ferromagnetic coupling between the main pole 40 and the ferromagnetic layer 50. Thus, the main pole 40 may be considered as a somewhat hybrid-type design, with the interlayer 52 and ferromagnetic layer 50 attached to an edge thereof. It should be noted that the main pole 40 may itself be a hybrid-type main pole design built up as a stack of multiple ferromagnetic layers potentially separated by non-ferromagnetic layers. Additionally, as shown in FIG. 5A, the ferromagnetic layer 50 may also be a hybrid-type design built up as a stack of multiple ferromagnetic layers 51 potentially separated by non-ferromagnetic layers 53. As shown in FIG. 5, the recording media 14 moves in the direction of arrow 54, thus defining leading 56 and trailing 58 edges of the main pole 40. In one form, the interlayer 52 and ferromagnetic layer 50 are provided at the trailing edge of the main pole 40, as shown in FIG. 5.

FIGS. 6–7 show the writing process of the magnetic recording head 38 according to the present invention illustrating the magnetization state of the main pole 40 and the ferromagnetic layer 50 for subsequent down and up transitions. As shown in FIG. 6, when the magnetization state of the main pole 40 is in a downward direction, the anti-ferromagnetic coupling of the interlayer 52 magnetizes the ferromagnetic layer 50 in an opposite upward direction. Similarly, as shown in FIG. 7, when the magnetization state of the main pole 40 is an upward direction, the anti-ferromagnetic coupling of the interlayer 52 magnetizes the ferromagnetic layer 50 in an opposite downward direction. The magnetization of the ferromagnetic layer 50 in a direction substantially anti-parallel, or opposite, to the magnetization direction of the main pole 40 reduces or cancels out the side flux components of the main pole 40, thus improving the write field gradient of the perpendicular recording head 38.

The thin ferromagnetic layer 50 is, in one example, a CoNiFe alloy with a saturation magnetic flux density (4 $\pi M_s$) equal to 2.0 Tesla and a thickness of 20 nm. The interlayer 52, in this one example, is a thin layer of ruthenium (Ru) having a thickness of 0.8 nm. Additionally, the interlayer 52 may include copper (Cu), rhodium (Rh), manganese (Mn), chromium (Cr), silver (Ag), gold (Au) or any other material capable of providing anti-ferromagnetic coupling between the main pole 40 and the ferromagnetic layer 50. The main pole 40, in this one example, is made of the same CoNiFe alloy as the ferromagnetic layer 50 and has a saturation magnetic flux density (4 $\pi M_s$) equal to 2.0 Tesla and a thickness of 300 nm. This type of recording head design, namely, the addition of the interlayer 52 and the ferromagnetic layer 50 on the sides of the main pole 40, results in improved on- and off-track field gradients, as will be shown below.

Figure 8:
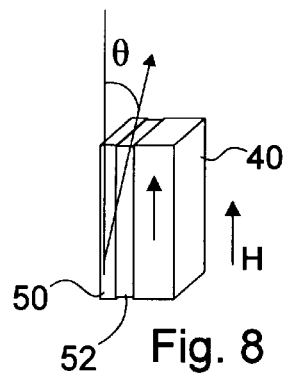
FIG. 8 is a partial isometric view of the main pole of the magnetic recording head according to the present invention, illustrating the directions of magnetization of the ferromagnetic layer, main pole and an external field (H) acting on the ferromagnetic layer.

The objective of the recording head 38 according to the present invention is that the magnetization direction of the thin ferromagnetic layer 50 be substantially anti-parallel to the magnetization direction of the main pole 40. The magnetization direction of the main pole 40 is set to write the up and down transitions during the writing/recording process, as shown in FIGS. 6–7. A range of thicknesses "t" for the ferromagnetic layer 50 is estimated for which an anti-parallel alignment of the magnetization directions of the ferromagnetic layer 50 and main pole 40 is achieved, while the main pole 40 is magnetized inductively by a write current supplied through the coil 46. The AF coupling energy constant, J, has been reported to be 5 mJ/m² for a ruthenium interlayer 52. Assuming that the magnetization of the main pole 40 is aligned close to perpendicular to the recording layer 26 during writing, and that the magnetic field at the ferromagnetic layer 50 is uniform and less than 200 Oe parallel to the magnetization direction of the main pole 40, the energy equation, ignoring all other energy terms, such as crystal anisotropy, etc., reads as follows:

$$E=J/t \cos \theta - 4 \pi M_s H \cos \theta,$$

with the angle θ being the angle between the magnetization directions of the ferromagnetic layer 50 and main pole 40, and the field H being an external field acting on the ferromagnetic layer 50 arising from current or main pole flux leakage, both as shown in FIG. 8. It follows then that the magnetization direction of the ferromagnetic layer 50 will be anti-parallel to the magnetization direction of the main pole 40 if:

$$t<J/4\pi M_s H.$$

With the saturation magnetic flux density (4 $\pi M_s$) equal to 2.0 Tesla, this results in an upper limit for the film thickness "t" of the ferromagnetic layer 50 to be approximately 155 nm.

Figure 9:
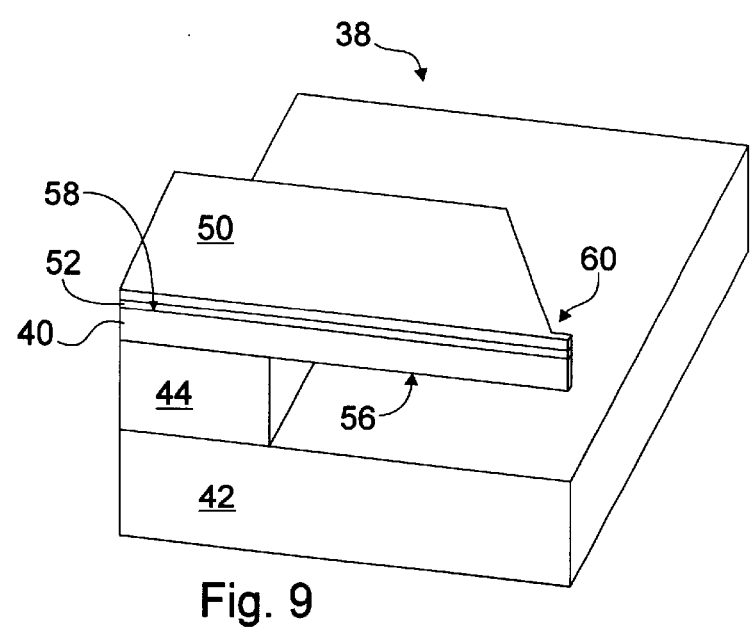
FIG. 9 is a partial isometric view of the perpendicular magnetic recording head shown in FIG. 5.

It should be understood that the interlayer 52 and the ferromagnetic layer 50 may be formed on the main pole 40 in a variety of geometric configurations. As shown in FIG. 9, which is a partial isometric view of the recording head 38 shown in FIG. 5, the interlayer 52 and the ferromagnetic layer 50 may be formed on the trailing edge 58 of the main pole 40, and formed generally in the same geometric shape as the main pole 40. Alternately, the interlayer 52 and the ferromagnetic layer 50 may be provided on the trailing edge 58 only at a pole tip region, shown generally at 60, of the main pole 40.

Figure 10:
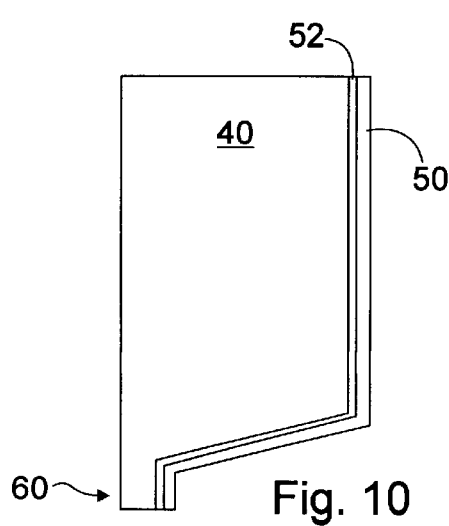
FIG. 10 is a side view of an alternate embodiment of the main pole of the perpendicular magnetic recording head according to the present invention.

Additionally, as shown in FIG. 10, which is a partial front view of the main pole 40, the interlayer 52 and ferromagnetic layer 50 may be provided on the sides of the main pole 40. Similarly, instead of providing the interlayer 52 and the ferromagnetic layer 50 along the entire side surfaces of the main pole 40, they may be provided only at the pole tip region 60 of the main pole 40.

The maximum thickness of the thin ferromagnetic layer 50 may be limited by reasons other than the anti-parallel alignment of the magnetization directions as previously discussed. The assumption is made that the magnetization direction of the main pole 40 is substantially perpendicularly aligned with the recording layer 26 when the main pole 40 is inductively magnetized during writing. This is the case if the thickness and moment of the ferromagnetic layer 50 is relatively small compared to the thickness and moment of the main pole 40. Otherwise, the field of the inductive write current will induce an undesirable canted spin flop state in which the magnetization direction of the main pole 40 will not be perpendicular to the recording layer 26. It should be noted, however, that the effectiveness of the field coupling from the write current and the magnetization of the ferromagnetic layer 50 can be reduced by constraining the area of the ferromagnetic layer 50 and interlayer 52 to the pole tip region 60 only.

It has been shown that the thickness of the thin ferromagnetic layer 50 may be in the range of up to tens of nano-meters for a main pole 40 thickness of, for example, 300 nm. The anti-parallel alignment of the magnetization directions of the thin ferromagnetic layer 50 and the main pole 40 results in an improved write field gradient during writing compared to a design without an anti-parallel coupled top ferromagnetic layer 50, as will be described below.

The magnetic field arising from the ferromagnetic layer 50 at the recording layer 26 is anti-parallel to the magnetic field arising from the main pole 40, as shown in FIGS. 6–7. This results in an improved write field gradient at the trailing edge 58 of the main pole 40 around the field of interest, namely, the dynamic coercivity of the recording layer 26, if the thicknesses of the interlayer 52 and thin ferromagnetic layer 50 and the saturation moment of the ferromagnetic layer 50 are chosen correctly.

To illustrate this, FEM modeling was performed in which the ferromagnetic layer 50 was modeled as a hard permanent magnet having a saturation magnetic flux density equal to 2.0 Tesla and a thickness of 30 nm. The interlayer 52 provided between the ferromagnetic layer 50 and the main pole 40 had a thickness of 30 nm. The main (write) pole 40 was 300 nm thick, and was magnetized by an inductive write current of 100 mA in the opposite direction of magnetization of the permanent magnet. The track width of the main pole 40 in this example was 130 nm, and the air bearing surface to soft underlayer 24 spacing was 35 nm.

Figure 2:
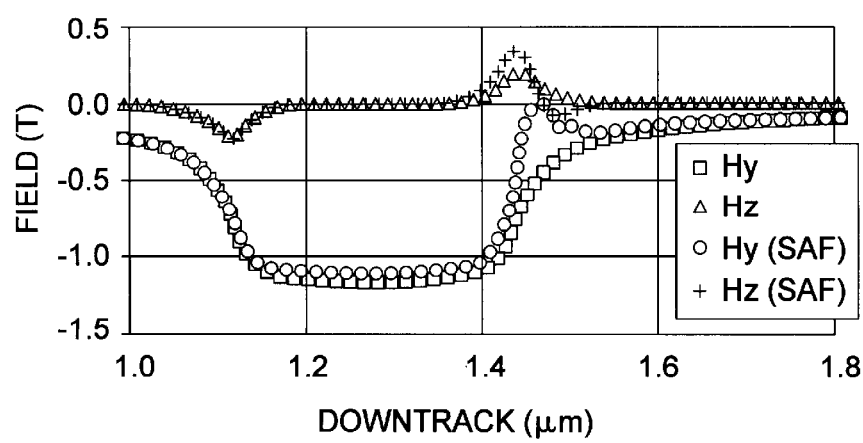
FIG. 2 is a graph of the down-track field profile comparing a conventional magnetic recording head with a magnetic recording head according to the present invention.

FIG. 2 illustrates, at Hy (SAF) and Hz (SAF), the on-track field profile at the center of the track and 20 nm from the air bearing surface for both the perpendicular and longitudinal on-track field components for the above-example. FIG. 2 also illustrates, at Hy and Hz, the field profile without a permanent magnet (ferromagnetic layer), i.e., for a conventional pole design. A comparison of the perpendicular write field gradients shows an improvement for the recording head according to the present invention (Hy (SAF) and Hz (SAF)) over conventional recording heads (Hy and Hz). FIG. 2 also illustrates an increase in the same longitudinal write field component due to the flux closure of the thin ferromagnetic layer 50 to the main pole 40. Consequently, the write field is slightly canted from perpendicular at the recording layer 26.

It is known in the art that the writeability, as well as the writing speed, of a perpendicularly magnetized grain depends upon the angle of the applied magnetic field to its uniaxial anisotropy axis, with perfect anti-parallel alignment being the worst. Therefore, the increase of a small, longitudinal field for the proposed inventive recording head will result in an increase in the writeability and write speed for a perpendicularly oriented grain without degrading the transition parameter, as the magnetic field is primarily perpendicular to the recording layer. By shrinking the dimensions of the interlayer, or spacer, 52, the magnitude of the longitudinal field component will increase, which is favorable for writing. Reducing the thickness of the thin ferromagnetic layer 50 will result in a reduced field superposition effect. However, one skilled in the art can anticipate that even reducing the thickness of the ferromagnetic layer 50 will still yield a substantial effect in field gradient sharpening and an increase in the longitudinal field component based on the data shown in FIG. 2.

Figure 3:
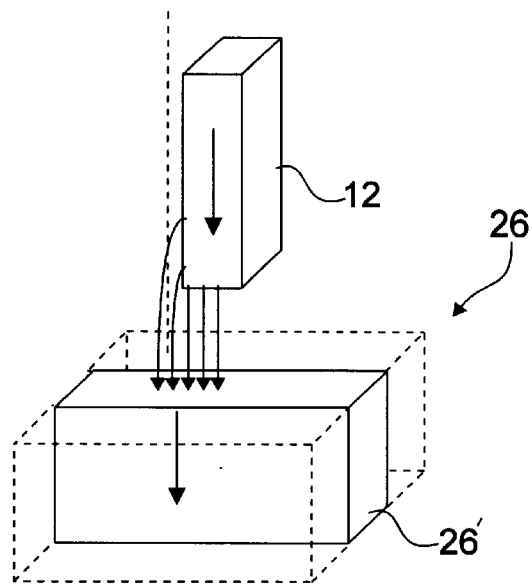
FIG. 3 is a partial isometric view of a prior art perpendicular magnetic recording head, illustrating the main pole and the recording layer.
Figure 4:
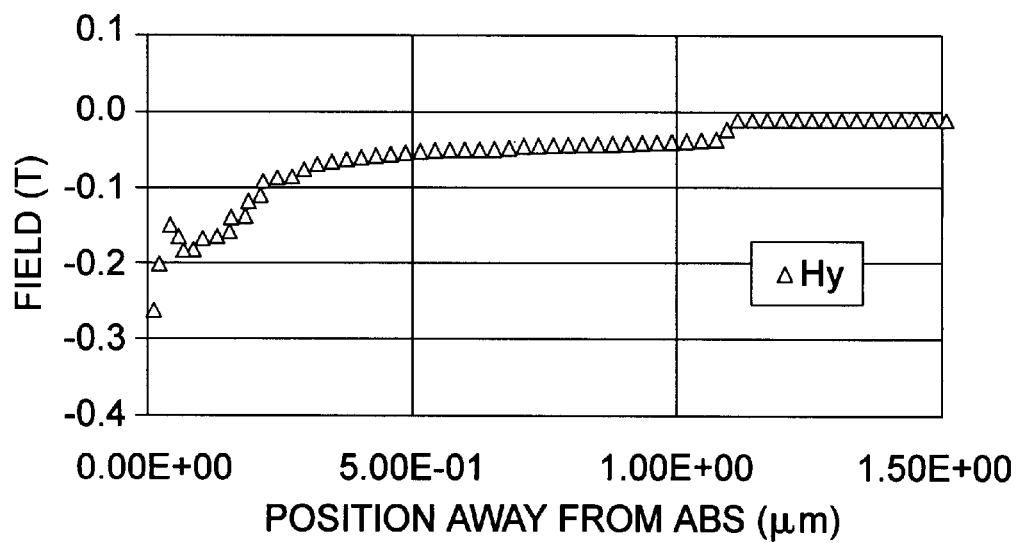
FIG. 4 is a graph of the flux generated by a conventional magnetic recording head at positions away from the air bearing surface.

In addition to the field superposition effect described above, the write gradient of the proposed inventive recording head 38 may also be superior to conventional recording head designs as a result of the magnetization of the main pole 40 being confined to be parallel to the plane of the trailing edge 58. In conventional write (main) pole designs, flux will arise from the magnetization at the air bearing surface of the main pole as well as from the sides of the main pole, which is schematically illustrated in FIG. 3. In the inventive recording head design, the flux from the sides of the main pole are reduced. The thin ferromagnetic layer 50 has a large in-plane shape anisotropy, as its thickness is small (a few nano-meters) relative to the track width (up to hundreds of nano-meters) compared to the shape anisotropy for conventional main poles. The shape anisotropy will force the magnetization of the ferromagnetic layer 50 in the plane of the main pole trailing edge. The strong anti-ferromagnetic coupling between the thin ferromagnetic layer 50 and the main pole 40, via the interlayer 52, results in a forced alignment of the magnetization of the main pole 40 in the plane of the trailing edge 58, which results in an increased on-track write field gradient.

Micromagnetic modeling has been done on conventional recording heads in which a large uniaxial anisotropy perpendicular to the recording layer was used. This modeling showed an increase in the on-track write field gradient with increasing uniaxial anisotropy constants, which effectively confines the magnetization of the conventional write pole in the plane of the trailing edge. Unfortunately, the large uniaxial anisotropy results in magnetic remanence problems for conventional write head designs. The inventive recording head design proposed herein has effectively the same resultant increase in the on-track write field gradient without introducing remanence problems.

While the present invention has been described with particular reference to the drawings, it should be understood that various modifications could be made without departing from the spirit and scope of the present invention.

We claim:

1. A perpendicular magnetic recording head comprising:
   a magnetic main pole;
   a coil magnetically coupled to the main pole for magnetizing the main pole in a first magnetization direction; and
   a layer of ferromagnetic material anti-ferromagnetically coupled to the main pole such that magnetization of the ferromagnetic layer is in a second magnetization direction substantially anti-parallel to the first magnetization direction of the main pole,
   wherein the ferromagnetic layer has a saturation magnetic flux density equal to or less than a saturation magnetic flux density of the main pole.

2. The perpendicular magnetic recording head of claim 1, wherein the ferromagnetic layer is provided at a trailing edge of the main pole.

3. The perpendicular magnetic recording head of claim 1, wherein the ferromagnetic layer is provided only at a pole tip region of the main pole.

4. The perpendicular magnetic recording head of claim 1, further comprising an interlayer between the main pole and the ferromagnetic layer anti-ferromagnetically coupling the ferromagnetic layer to the main pole.

5. The perpendicular magnetic recording head of claim 4, wherein the interlayer is selected from the group of materials consisting of Ru, Cu, Rh, Mn, Cr, Ag and Au.

6. The perpendicular magnetic recording head of claim 4, wherein the interlayer and the ferromagnetic layer are provided at a trailing edge of the main pole.

7. The perpendicular magnetic recording head of claim 4, wherein the interlayer and the ferromagnetic layer are provided only at a pole tip region of the main pole.

8. The perpendicular magnetic recording head of claim 1, wherein the main pole and the ferromagnetic layer each comprise at least one material selected from the group of soft magnetic materials including at least one of Co, Fe and Ni.

9. The perpendicular magnetic recording head of claim 1, wherein the main pole has a first thickness and the ferromagnetic layer has a second thickness, with the first thickness greater than the second thickness.

10. A perpendicular magnetic recording head comprising:
    a magnetic main pole;
    a coil magnetically coupled to the main pole for magnetizing the main pole in a first magnetization direction; and
    a layer of ferromagnetic material anti-ferromagnetically coupled to the main pole such that magnetization of the ferromagnetic layer is in a second magnetization direction substantially anti-parallel to the first magnetization direction of the main pole,
    wherein the main pole comprises a hybrid-type main pole having multiple layers of ferromagnetic material separated by non-ferromagnetic layers.

11. A perpendicular magnetic recording head comprising:
    a magnetic main pole;
    a coil magnetically coupled to the main pole for magnetizing the main pole in a first magnetization direction; and
    a layer of ferromagnetic material anti-ferromagnetically coupled to the main pole such that magnetization of the ferromagnetic layer is in a second magnetization direction substantially anti-parallel to the first magnetization direction of the main pole,
    wherein the ferromagnetic layer comprises a hybrid-type ferromagnetic layer having multiple layers of ferromagnetic material separated by non-ferromagnetic layers.

12. The perpendicular magnetic recording head of claim 1, further comprising a magnetic return pole forming a return path for a magnetic flux.

13. A device comprising:
a magnetic main pole magnetizable in a first magnetization direction by a coil magnetically coupled thereto; and
a layer of ferromagnetic material anti-ferromagnetically coupled to the main pole such that magnetization of the ferromagnetic layer is in a second magnetization direction substantially anti-parallel to the first magnetization direction of the main pole,
wherein the ferromagnetic layer has a saturation magnetic flux density equal to or less than a saturation magnetic flux density of the main pole.

14. The device of claim 13, further comprising an interlayer between the main pole and the ferromagnetic layer anti-ferromagnetically coupling the ferromagnetic layer to the main pole.

15. The device of claim 14, wherein the interlayer is selected from the group of materials consisting of Ru, Cu, Rh, Mn, Cr, Ag and Au.

16. The device of claim 14, wherein the interlayer and the ferromagnetic layer are provided at a trailing edge of the main pole.

17. The device of claim 13, wherein the main pole and the ferromagnetic layer each comprise at least one material selected from the group of soft magnetic materials including at least one of Co, Fe and Ni.

18. The perpendicular magnetic recording head of claim 10, wherein the ferromagnetic layer is provided at a trailing edge of the main pole.

19. The perpendicular magnetic recording head of claim 11, wherein the ferromagnetic layer is provided at a trailing edge of the main pole.

20. The perpendicular magnetic recording head of claim 11, wherein the main pole and the ferromagnetic layer each comprise at least one material selected from the group of soft magnetic materials including at least one of Co, Fe and Ni.

* * * * *